US007002312B2

(12) United States Patent
Wojciak, Jr.

(10) Patent No.: US 7,002,312 B2
(45) Date of Patent: Feb. 21, 2006

(54) SYSTEM AND METHOD OF ACTUATING A MOVABLE BARRIER OPERATOR

(75) Inventor: Bernard J. Wojciak, Jr., Naperville, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 40 days.

(21) Appl. No.: 10/748,885

(22) Filed: Dec. 30, 2003

(65) Prior Publication Data

US 2005/0140321 A1 Jun. 30, 2005

(51) Int. Cl.
*G05B 5/00* (2006.01)

(52) U.S. Cl. ........................ 318/452; 318/581; 318/445

(58) Field of Classification Search ................ 318/452, 318/581, 445, 453, 466; 368/47; 340/545.1
See application file for complete search history.

(56) References Cited

U.S. PATENT DOCUMENTS

2002/0069299 A1 * 6/2002 Rosener et al. ............. 709/248
2002/0180600 A1 * 12/2002 Kirkland et al. ......... 340/545.1
2002/0186620 A1 * 12/2002 Addy et al. ................... 368/47

* cited by examiner

*Primary Examiner*—Karen Masih
(74) *Attorney, Agent, or Firm*—Fitch, Eve, Tabin & Flannery

(57) ABSTRACT

A system and method for actuating a moveable barrier operating system. A wireless time signal at a receiver. A time-of-day signal is supplied at the output of the receiver. The receiver is automatically reset using the wireless time signal when the time-of-day signal is different than the time represented by the wireless time signal. A moveable barrier is actuated using the time-of-day signal at the output of the receiver.

13 Claims, 8 Drawing Sheets

SYSTEM AND METHOD OF ACTUATING A MOVABLE BARRIER OPERATOR

FIELD OF THE INVENTION

The field of the invention generally relates to methods and devices for controlling movable barrier operators. More particularly, the invention relates to movable barrier operators that are actuated by time signals.

BACKGROUND OF THE INVENTION

A number of garage door operators have been sold over the years. Most garage door operators include a head unit containing a motor connected to a transmission. The transmission, which may be a chain drive or a screw drive, is then coupled to the garage door for opening and closing a garage door.

Such garage door operators also typically include a wall control unit, which is connected via one or more wires to the head unit to send signals to the head thereby causing the head unit to open and close the garage door. In addition, these operators often include a receiver unit at the head unit to receive transmissions from a hand-held code transmitter or from a keypad transmitter, which may be affixed to the outside of the garage or other structure.

The garage door operator may be actuated in a variety of ways. For example, a user may punch a button or enter other types of information at a transmitter to actuate the garage door operator. Some previous garage door systems also included a clock or other timing device, which was used to actuate the door at certain times of the day. The clocks in these previous systems received energy to operate from a battery or were hard-wired to a conventional electrical power supply.

The disadvantage of using these previous arrangements is that manual re-synchronization is required if power to the clock were lost or the clock for some other reason lost synchronization. Manual re-synchronization of these systems is also time consuming for the user to accomplish and inconvenient, since power loss often occurs during periods of inclement weather or at night making it difficult to accomplish the task.

Because of the need to eliminate the need to manually re-synchronize the system, a battery backup for the clock is employed in some previous systems. However, the use of this additional component necessarily increases the cost of the garage door system. In addition, the battery itself needs to be replaced from time to time further inconveniencing the user.

Previous system are also incapable of adjusting time when time changes occur. For example, when the time changes from standard time to daylight savings time or vice versa, previous systems must be manually re-synchronized. Furthermore, since it is unknown where (and in which particular time zone) the system is to be positioned, synchronization of the system is needed at least once (during system initialization) in order to set the time of the system to the correct local time.

SUMMARY OF THE INVENTION

The present invention is directed to a system and method for actuating a moveable barrier operating system using a wireless time signal. A receiver unit within the movable barrier operating system receives a wireless time signal, which automatically synchronizes a clock at the receiver.

The synchronization is accomplished automatically by using the received wireless time signal such that if power is removed or the clock becomes otherwise unsynchronized, the time signal automatically re-synchronizes the clock. Re-synchronization is accomplished quickly and efficiently without the need for human intervention and without the addition of costly backup components to the system.

In many of these embodiments, a wireless time signal is received by a receiver unit, which includes a timing device such as a clock. The timing device is synchronized by the wireless time signal. The timing device supplies a time-of-day signal at the output of the receiver to actuate a movable barrier operator. The timing device is automatically reset using the wireless time signal when a comparison at the receiver indicates that the time-of-day signal is different than the time indicated by the wireless time signal.

A user may program the system to actuate the movable barrier based upon certain predefined criteria. For example, the user can program the moveable barrier operator to be actuated to close the movable barrier at a predetermined time. The movable barrier operator can also be programmed to prevent the movement of a movable barrier at a predetermined time or times. In addition, the movable barrier can be programmed to be opened at a predetermined time or times. To accomplish the programming, a convenient user interface is provided whereby a user can enter an action that the moveable barrier is to do (e.g., open or close) and a time or times when the action is to occur.

In another approach, the outside wireless time signal is used to directly actuate the barrier. In this case, no timing device is needed. This approach is advantageous because it eliminates the need for a clock or other timing device as a system component.

Thus, the timing device in a receiver in a garage door system would never need to be manually reset or re-synchronized. The user may conveniently program the garage door to be opened or closed at particular times of the day and does not have to manually re-synchronize the system either when installing the system or when the system loses synchronization, for instance, at times when the power is lost to the system or in other way loses synchronization because of a time change.

In addition, since any re-synchronization occurs automatically using only the wireless time signal as the trigger, no costly backup components are required. Furthermore, no matter where the user is located in the world, the timing device in the opener automatically keeps accurate time.

Figure 1:
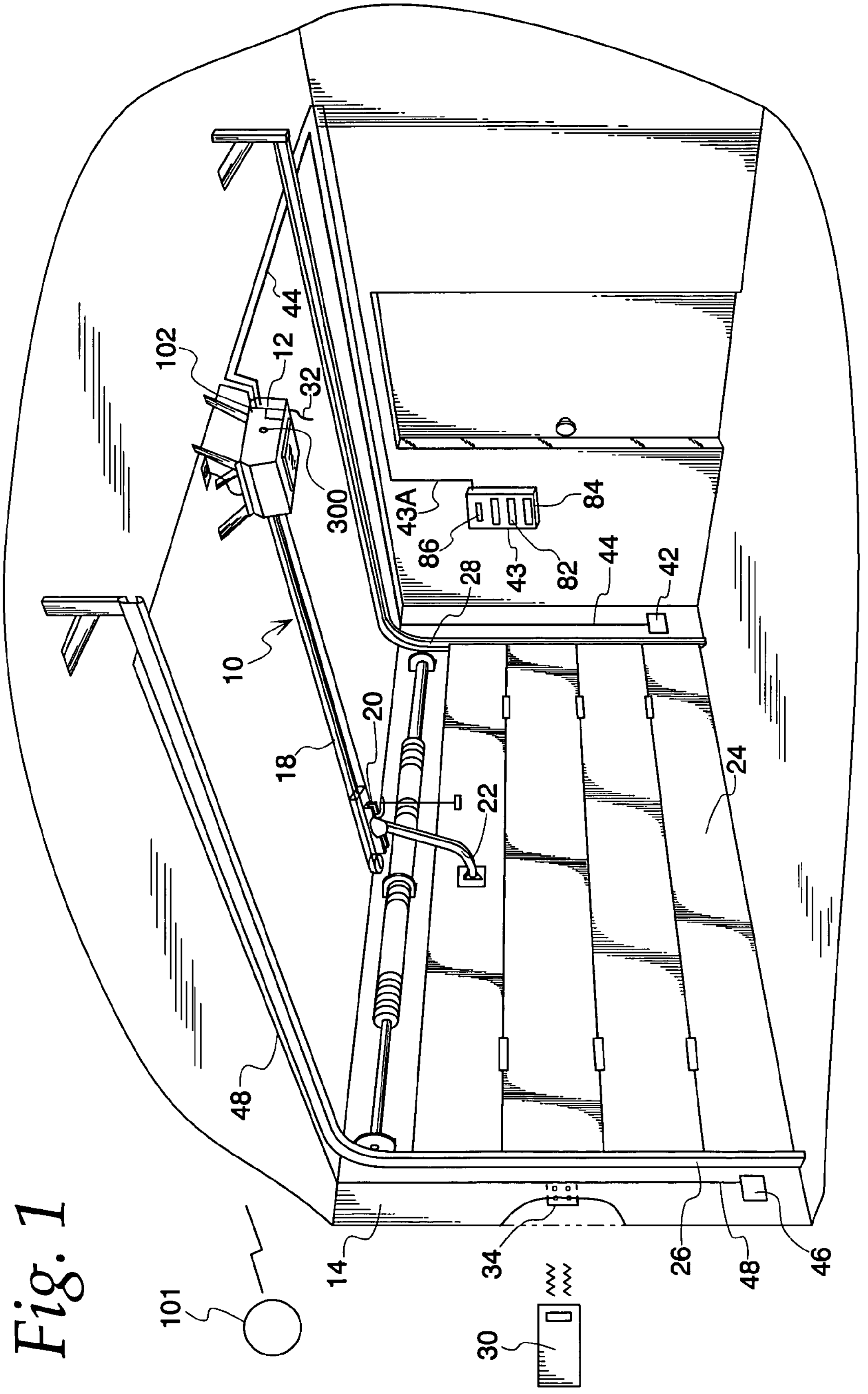
FIG. 1 is a perspective view of a garage door opening system according to the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENTS

Referring now to the drawings and especially to FIG. 1 and FIGS. 2*a–c*, a movable barrier operator or garage door operator is generally shown therein and includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 as will appear hereinafter. An external control pad 34 is positioned on the outside of the garage having a plurality of buttons thereon and communicates via radio frequency transmission with the antenna 32 of the head unit 12. An optical emitter 42 is connected via a power and signal line 44 to the head unit. An optical detector 46 is connected via a wire 48 to the head unit 12.

The head unit 12 also includes a receiver unit 102. As described elsewhere in this specification, the receiver unit 102 receives a wireless time signal, which is used to actuate the garage door opener. In one approach, the receiver unit 102 includes a timing device, which is used to actuate the barrier. In another approach, the timing device is omitted and the wireless time signal itself is used to actuate the barrier. A user can program the times of actuation of the movable barrier, for example, using a wall control panel 43, and this can be stored in a memory in a motor controller 94.

The head unit 12 has the wall control panel 43 connected to it via a wire or line 43A. More specifically, the wall control panel 43 is connected to a charging circuit 70 and a discharging circuit 72, coupled via respective lines 74 and 76 to a wall control decoder 78. The wall control decoder 78 decodes closures of a lock switch 80, a learn switch 82 and a command switch 84 in the wall circuit. The wall control panel 43 also includes a light emitting diode 86 connected by a resistor 88 to the line 43 and to ground to indicate that the wall control panel 43 is energized by the head unit 12. Switch closures are decoded by the wall decoder 78 which sends signals along lines 90 and 92 to a motor control 94 coupled via motor control lines 96 to an electric motor 98 positioned within the head unit 12. A tachometer 100 receives a mechanical feed from the motor 98 and provides feedback signals indicative of the motor speed or motion on lines 103 to the motor controller 94.

Figure 2A:
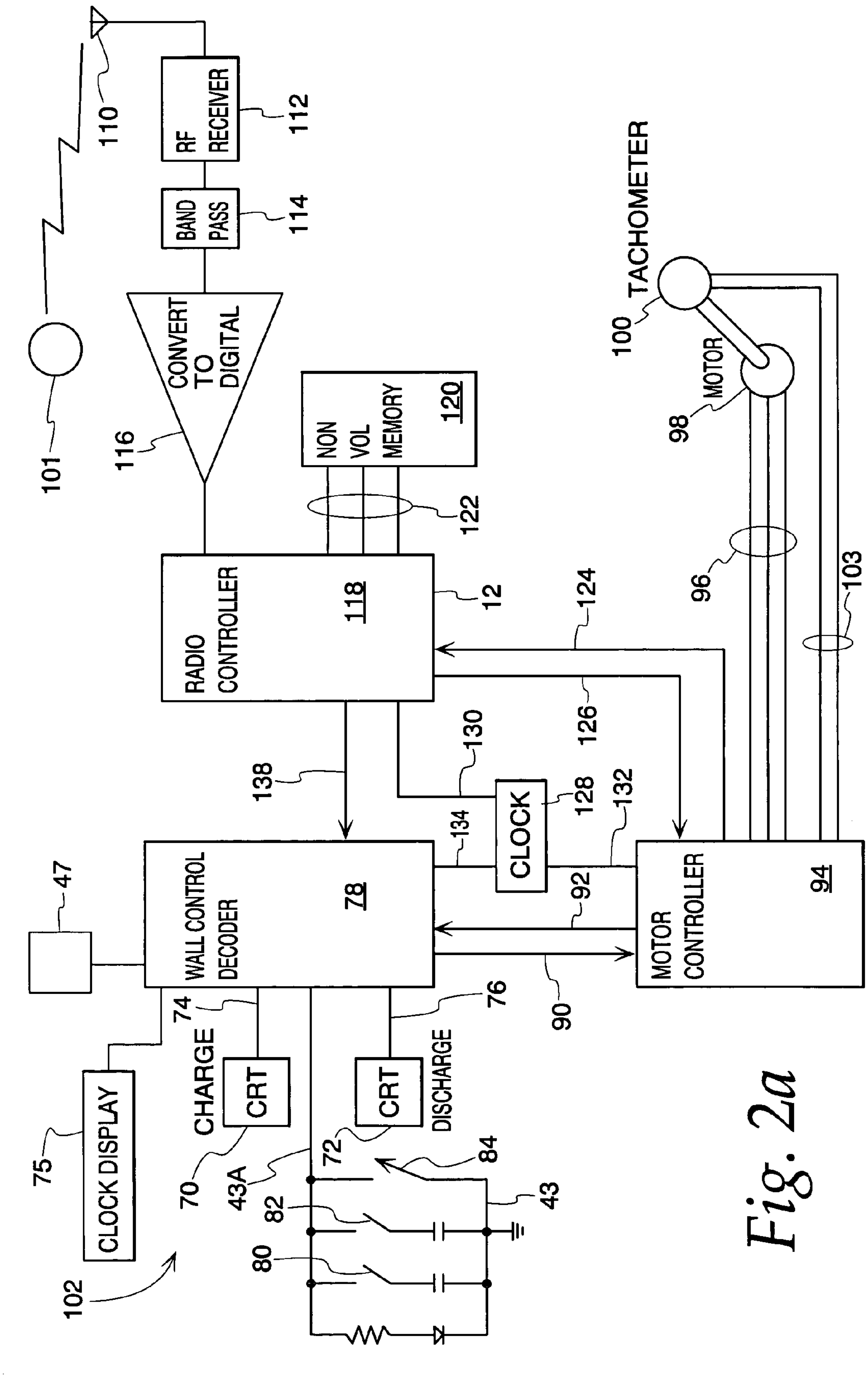
FIGS. 2*a–c* are block diagrams of a receivers for determining a time signal to actuate a movable barrier operator according to the present invention.

Referring now specifically to FIG. 2*a*, one example of the receiver unit 102 in FIG. 1 is described. The receiver unit includes an antenna 110 coupled to receive radio frequency signals from the fixed RF keypad 34, the hand-held transmitter 30, or a time signal source 101. The RF signals from the time signal source are wireless time signals indicating time information. A clock 128 is synchronized by a wireless time coded signal transmitted by the signal source 101.

In one example, the signal source 101 is a radio signal may be supplied by the WWV, WWVB, and WWVH radio stations in the United States. The stations broadcast a wireless signal that includes seconds pips, which are used to identify the start of second intervals. These stations also broadcast time codes as a way of identifying seconds intervals.

In another example, the signal source 101 is a transmitter in the Global Positioning Satellite (GPS) system. Clocks within the GPS system combine time estimates from multiple satellite atomic clocks with error estimates maintained by a network of ground stations to produce a timing signal. Because they compute the time and position simultaneously from readings from several different sources, GPS clocks can automatically compensate for many defects and can achieve increased accuracy under many conditions.

In another example of a timing source, the signal source 101 is a transmitter in the Long Range Navigation (LORAN) system, which is a terrestrial radio navigation system using ground based transmitters. In this system, hyperbolic LORAN lines of position (LOPs) are formed by measuring the difference in reception times of synchronized signals. Groups of LORAN stations are used to form intersecting LOPs to provide cross fixing. A LORAN net, or chain, includes a master station, initiating a time signal, and a series of slave stations that receive the signal.

Regardless of the type of source, the received wireless time signals are fed to a radio frequency receiver 112 where they are buffer amplified and supplied to a bandpass circuit 114 which outputs low frequency signals in the range of 1 Hz to 1 kHz. The low frequency signals are fed to an analog-to-digital converter 116 that sends digitized code signals to a radio controller 118. The radio controller 118 is also connected to receive signals from a non-volatile memory 120 over a non-volatile memory bus 122 and to communicate via lines 124 and 126 with the motor controller 94.

The clock or other timing device 128 is also provided, coupled via lines 130 with the radio controller 118, a line 132 with the motor controller 94 and a line 134 with the wall control decoder 78. The line 132 is a time-of-day signal. The line 130 is used to synchronize the clock 128. The time-of-day signal on the line 132 is also fed back to the radio controller 118 via line 124.

The radio controller 118 receives the wireless time signal and compares the wireless time signal to the time-of-day signal 132 produced buy the clock 128. If a match is indicated, the radio controller 118 does nothing. If a match is not indicated, the radio controller 118 resets the clock 128 using the time signal from the signal source. Thus, the resetting of the clock 128 is not dependent upon power being supplied to the clock 128. Instead, the clock 128 is reset quickly based upon the time signal received from the signal source 101. Further, receipt of the wireless time signal may be used to automatically set the clock when the system is initialized. Alternatively, a user may manually set the clock using the control panel.

A user may program the times of actuation of the movable barrier operator by setting the switches on the wall control unit 43 or by using a keypad 47. Alternatively, the times may be set by actuating controls on the transmitter 30. If programmed by the switches or keypad, the information is communicated to the motor controller 94 via the line 90. The motor controller 94 may return information to the unit 43 via the lead 92. The decoder 78 is used to decode signals received from the wall control unit 43 and encode signals from the motor controller 94 to the wall control unit 43.

Figure 2B:
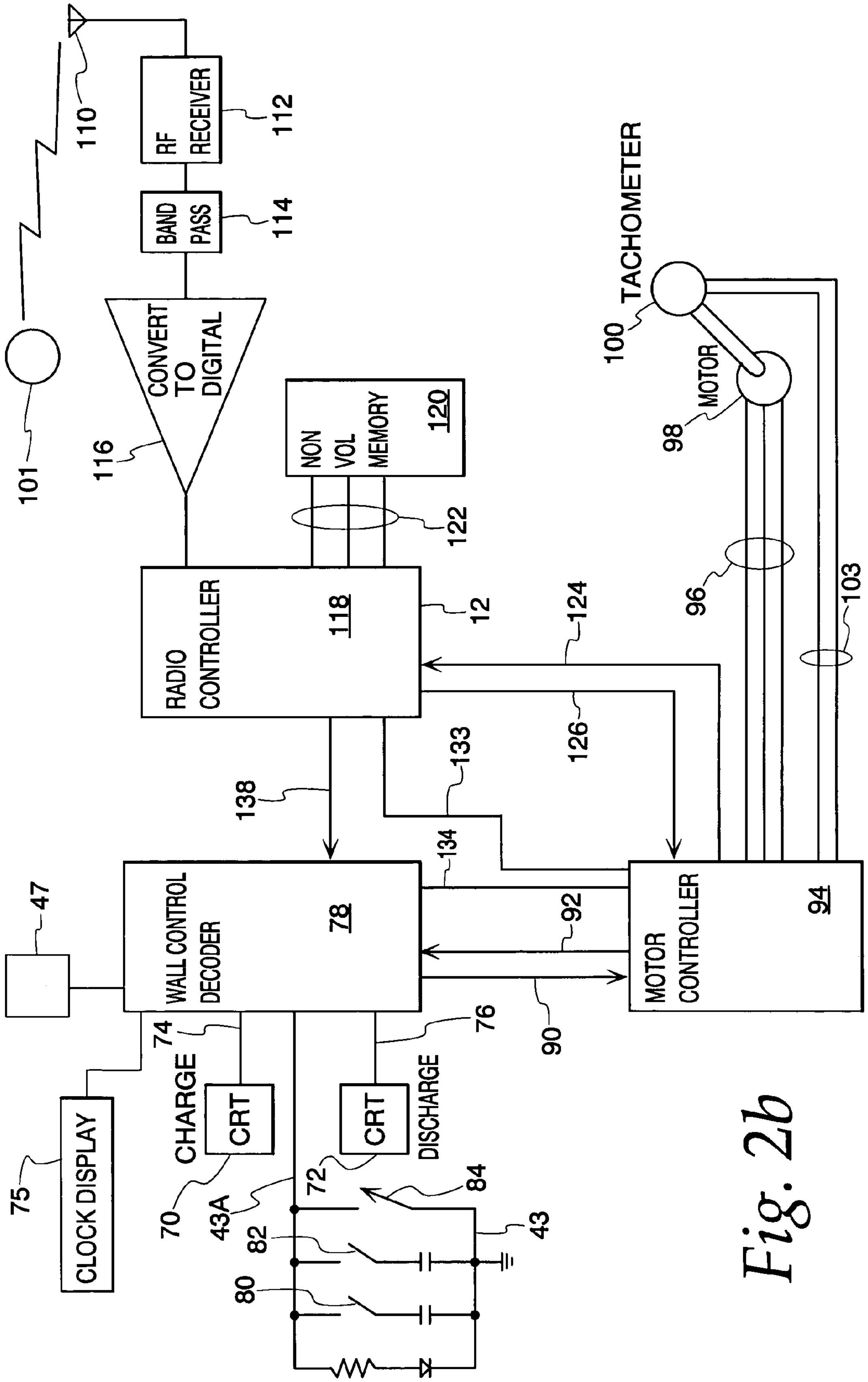

Referring now to FIG. 2*b*, another example of a receiver unit 102 in FIG. 1 is described. The circuit of FIG. 2*b* is similar as that with respect to FIG. 2*a* except the clock has been removed from the system. In the case of the circuit of FIG. 2*b*, the receiver unit 102 includes an antenna 110 coupled to receive radio frequency signals from the fixed RF keypad 34, the hand-held transmitter 30, or a time signal source 101.

The RF signals from the time signal source are wireless time signals indicating time information. The wireless time signals are fed to a radio frequency receiver 112 where they are buffer amplified and supplied to a bandpass circuit 114 which outputs low frequency signals in the range of 1 Hz to 1 kHz. The low frequency signals are fed to an analog-to-digital converter 116 that sends digitized code signals to a radio controller 118.

The radio controller 118 is also connected to receive signals from a non-volatile memory 120 over a non-volatile memory bus 122 and to communicate via lines 124 and 126 with the motor controller 94. The radio controller 118 receives the signals from signal source 101 and directly feeds the signals to the motor controller 94 via line 133. The motor controller 94 uses the signals to determine when to operate the motor 98 via the control lines 96. In this case, the received wireless time signal is frequent enough so that no clock is needed. The wireless time signal is fed directly from the radio controller 118 to the motor controller 94 where the signal is used to actuate the motor at predetermined times. The other elements of FIG. 2*b* operate in the same way as already described with respect to FIG. 2*a*.

Figure 2C:
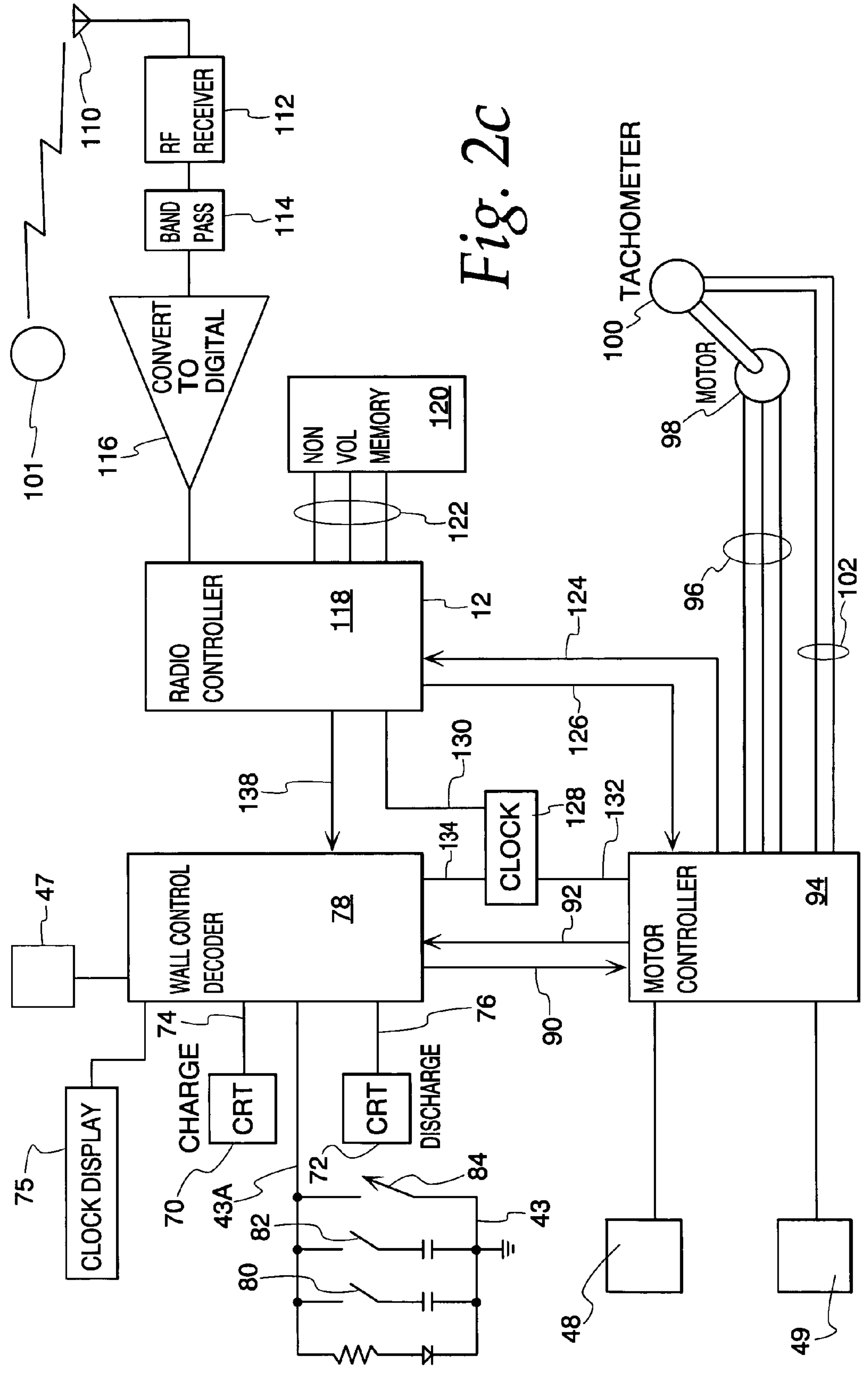

Referring now to FIG. 2*c*, another example of the receiver unit 102 in FIG. 1 is described. The circuit of FIG. 2*c* is similar as that with respect to FIG. 2*a* except that the wireless time signal is used with other information to determine if the garage door is to be actuated. In the case of the circuit of FIG. 2*c*, the receiver unit includes an antenna 110 coupled to receive wireless time signals either from the fixed RF keypad 34, the hand-held transmitter 30, or a time signal source 101. The wireless time signals are fed to a radio frequency receiver 112 where they are buffer amplified and supplied to a bandpass circuit 114 which outputs low frequency signals in the range of 1 Hz to 1 kHz. The low frequency signals are fed to an analog-to-digital converter 116 that sends digitized code signals to a radio controller 118.

The radio controller 118 is also connected to receive signals from a non-volatile memory 120 over a non-volatile memory bus 122 and to communicate via lines 124 and 126 with the motor controller 94. A clock 128 is also provided, coupled via lines 130 with the radio controller 118, a line 132 with the motor controller 94 and a line 134 with the wall control decoder 78. The line 132 is a time-of-day signal and the line 130 is used to synchronize the clock. The time-of-day signal on the line 132 is also fed back to the radio controller 118.

The radio controller 118 receives the time signal and compares the time signal to the time-of-day signal 132 produced buy the clock 204. If a match is indicated, the radio controller 118 does nothing. If a match is not indicated, the radio controller 118 resets the clock 128 using the time signal from the signal source. Thus, the resetting of the clock 128 is not dependent upon power being supplied to the clock 128. Instead, the clock 128 is reset quickly based upon the time signal received from the signal source 208.

The motor controller 94 receives signals from an outside source. In one example, this may be from the sensor 48 and indicate whether an object is obstructing the door. In another example, the motor controller 94 uses the information indicative of the status of the door, for example, whether the door is open, closed, or disabled from a sensor 49 or from internal status information stored within the system.

The motor controller 94 takes the time-of-day and the additional information and makes a determination of whether and/or to what extent to actuate the door. For example, if an obstruction is in the door and the motor controller 94 is programmed to close the door at a certain time, then the closing of the door may be prohibited. In another example, if the status of the door indicates that the door has been deactivated, then if the door has been programmed to be open at a certain time of the day, the opening is prohibited.

Figure 3A:
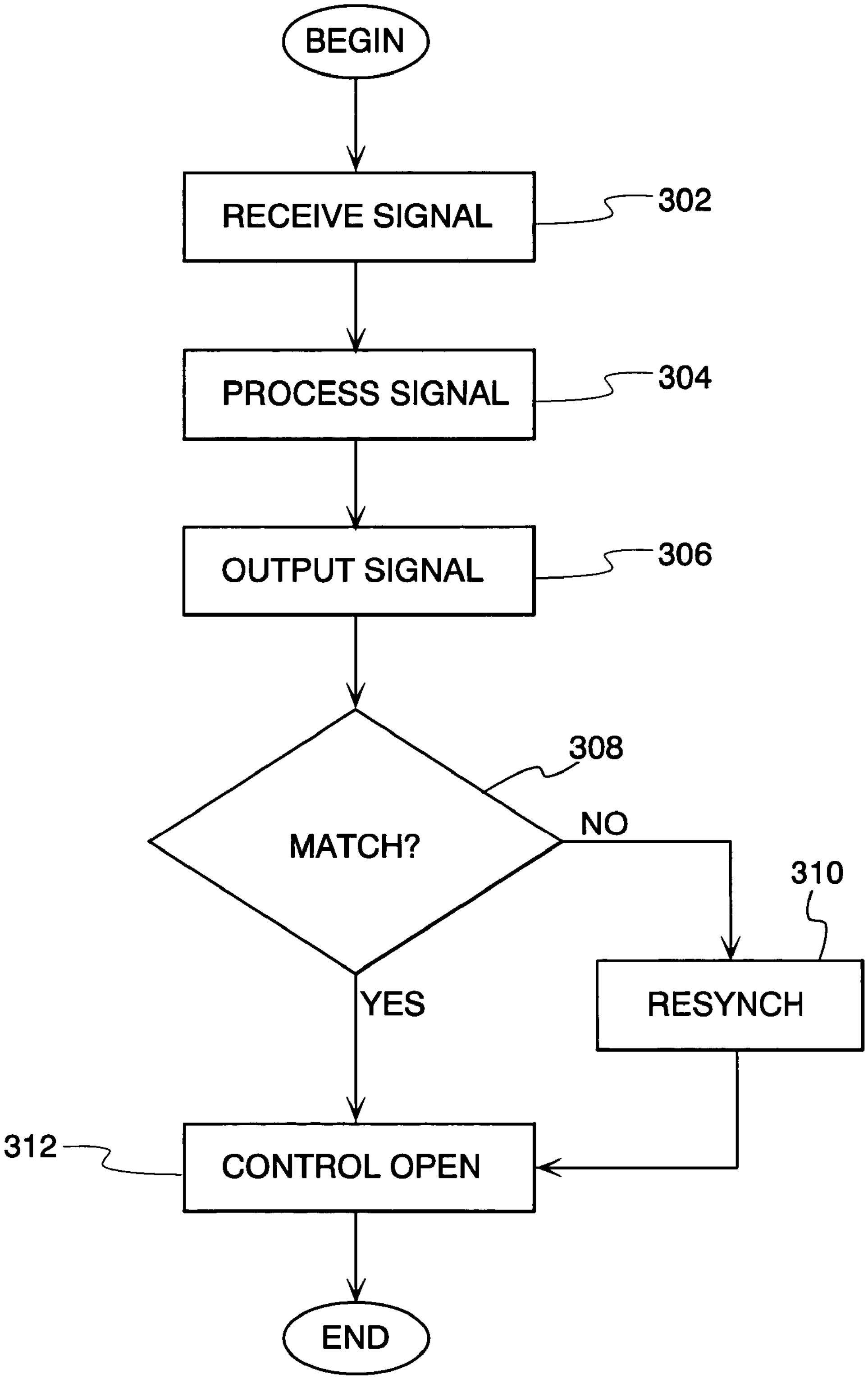
FIGS. 3*a–c* are flowcharts showing the operation of the receivers in FIGS. 2*a–c* according to the present invention.

Referring now also to FIG. 3*a*, one example of the operation of the receiver unit of FIG. 2*a* is described. At step 302, a wireless time signal is received at the receiver unit. The wireless time signal may be received from anytime signal source, for example, from a radio station, from GPS system, from LORAN system, or from any other time signal source. The signal itself may be in the form of an encoded time signal.

At step 304, the time signal is processed at the receiver unit. For example, the signal may be processed from an RF format into a digital format so that it is usable by the radio controller 118. The radio controller 118 then uses the signal to synchronize a clock in the receiver.

At step 306, the time-of-day is placed at the output of the receiver unit. The time-of-day is used by the motor controller 94 of the garage door opener to determine when to actuate the door.

At step 308, it is determined by a radio controller 118 in the receiver unit if the time-of-day signal created by the clock is different than the time indicated by the received wireless time signal. For instance, the radio controller 118 compares the time-of-day signal output by the clock to the received time signal. If the answer is negative, then at step 310 the clock within the receiver unit is reset using the wireless time signal when the time-of-day signal is different than a time represented by the wireless time signal. If the answer is affirmative, control continues at step 312.

At step 312, a moveable barrier operator is controlled in response to using the time-of-day output of the receiver by having the motor controller 94 actuate the barrier at specific times. The motor controller 94 may be programmed to close the movable barrier at a predetermined time. In addition, the motor controller 94 may be programmed to prevent the movement of a movable barrier at a predetermined time. Furthermore, the motor controller 94 may be programmed to open a movable barrier at a predetermined time.

Figure 3B:
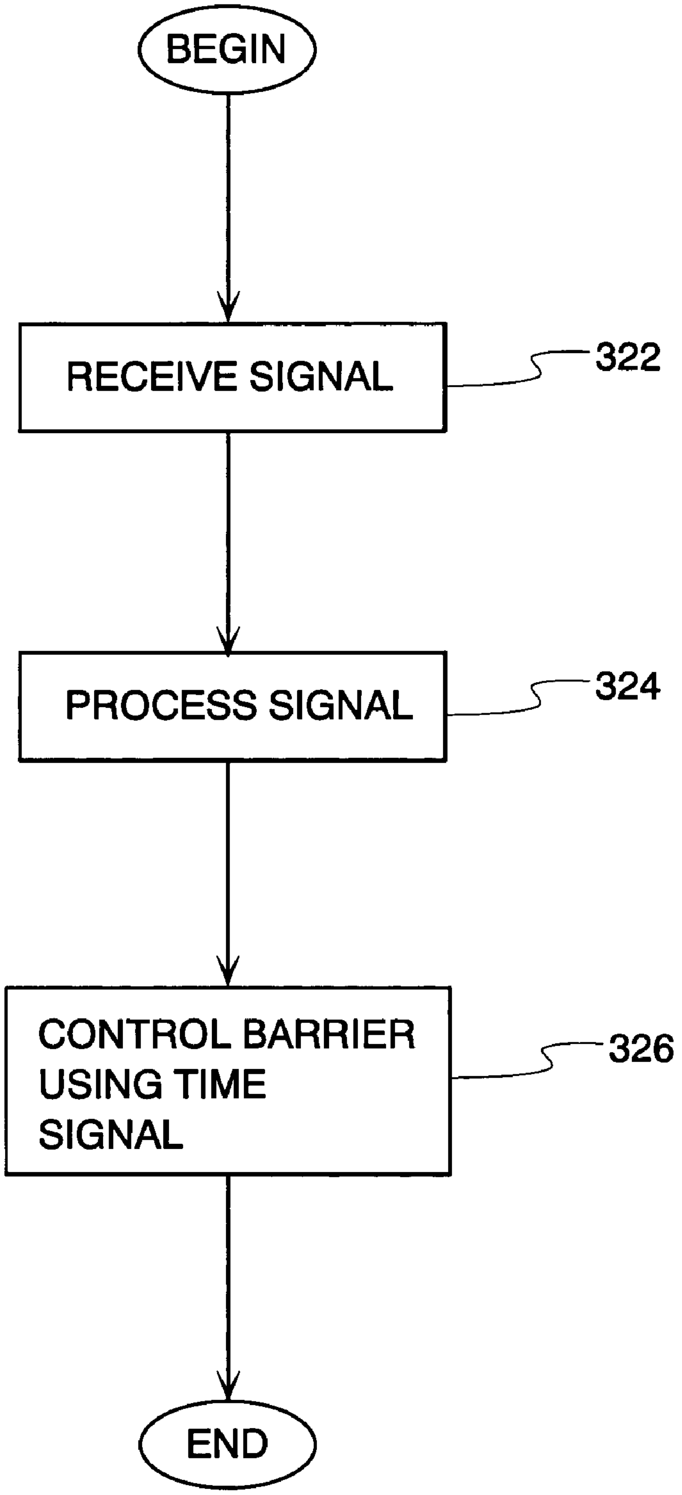

Referring now also to FIG. 3*b*, one example of the operation of the receiver unit in FIG. 2*b* is described. At step 322, a wireless time signal is received at the receiver unit. The wireless time signal may be received from any time signal source, for example, from a radio station, from GPS system, from LORAN system, or from any other time signal source. The signal itself may be in the form of an encoded time signal.

At step 324, the time signal is processed by a radio controller 118 in the receiver unit and output directly to the motor controller 94 to acuate the motor of the garage door opener. No clock is used in this approach and the received time signal is output to the motor controller, which uses the signal to determine when to actuate the door.

At step 326, the moveable barrier operator is controlled in response to using the time-of-day output of the receiver. The motor controller 94 may be programmed to close the movable barrier at a predetermined time. In addition, the motor controller 94 may be programmed to prevent the movement of a movable barrier at a predetermined time. Furthermore, the motor controller 94 may be programmed to open a movable barrier at a predetermined time.

Figure 3C:
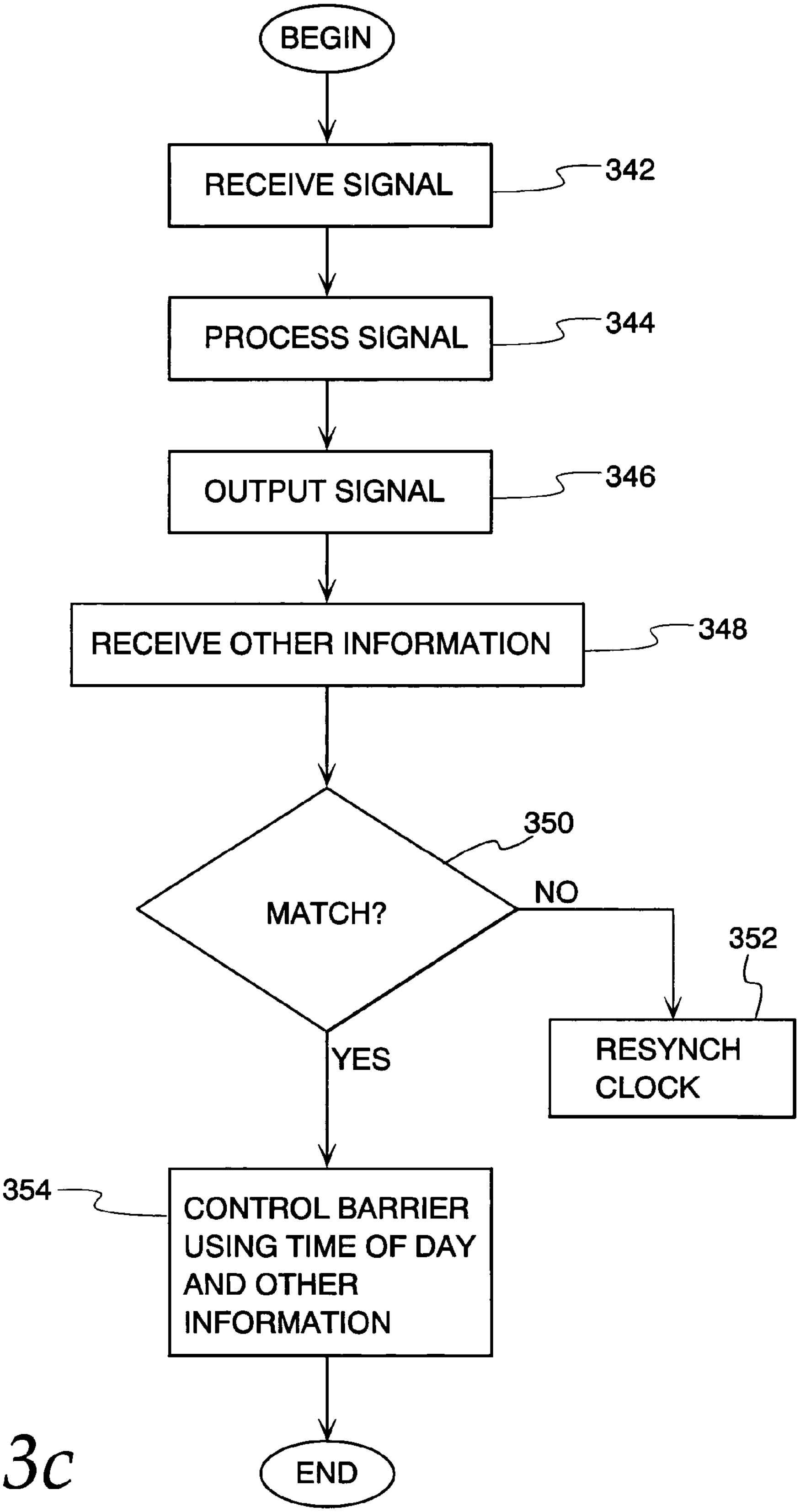

Referring now also to FIG. 3*c*, one example of the operation of the receiver unit of FIG. 2*c* is described. At step 342, a wireless time signal is received at a radio controller

118 in the receiver. The wireless time signal may be received from anytime signal source, for example, from a radio station, from GPS system, from LORAN system, or from any other time signal source. The signal itself may be in the form of an encoded time signal.

At step 344, the wireless time signal is processed by the radio controller 118 in the receiver. For example, the signal may be processed from an RF form into a digital form so that it is usable by the radio controller 118.

At step 346, the time-of-day signal produced by the clock is placed at the output of the receiver unit. The time-of-day is used by the motor controller 94 of the garage door opener to determine when to actuate the door.

At step 348, other information used in determining whether and how to actuate the opener is received. This information may include the status of the door or whether there is an obstruction in the door.

At step 350, it is determined if the time-of-day signal at the output of the receiver unit is different than the received wireless time signal. For instance, the radio controller 118 compares the time-of-day signal output by the clock to the received time signal. If the answer is negative, at step 352 the clock in the receiver unit is reset using the wireless time signal when the time-of-day signal is different than a time represented by the wireless time signal. If the answer is affirmative, control continues at step 354.

At step 354, a moveable barrier operator is controlled using the time-of-day output of the receiver and the other information received. The motor controller 94 may be programmed to close the movable barrier at a predetermined time. In addition, the motor controller 94 may be programmed to prevent the movement of a movable barrier at a predetermined time. Further, the motor controller 94 may be programmed to open a movable barrier at a predetermined time. For example, if an obstruction is in the door and the motor controller 94 is programmed to close the door at a certain time, then the closing of the door may be prohibited. In another example, if the status of the door indicates that the door has been deactivated, then if the door has been programmed to be open at a certain time of the day, the opening is prohibited.

Figure 4C:
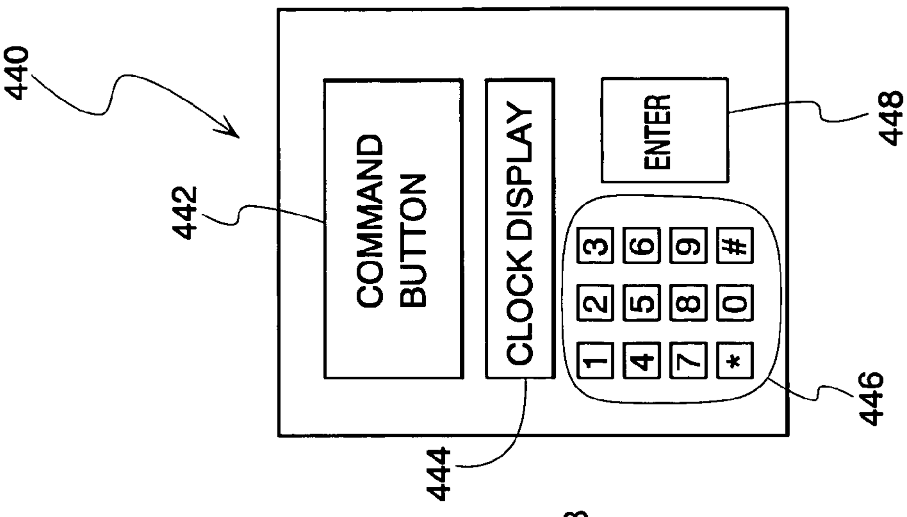
FIGS. 4*a–c* are diagrams showing the wall unit and a clock display according to the present invention.
Figure 4B:
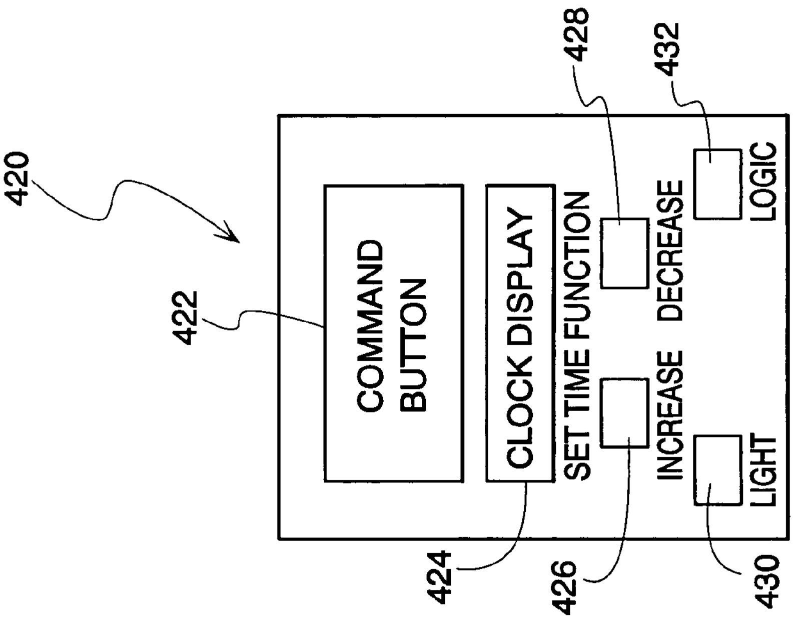
Figure 4A:
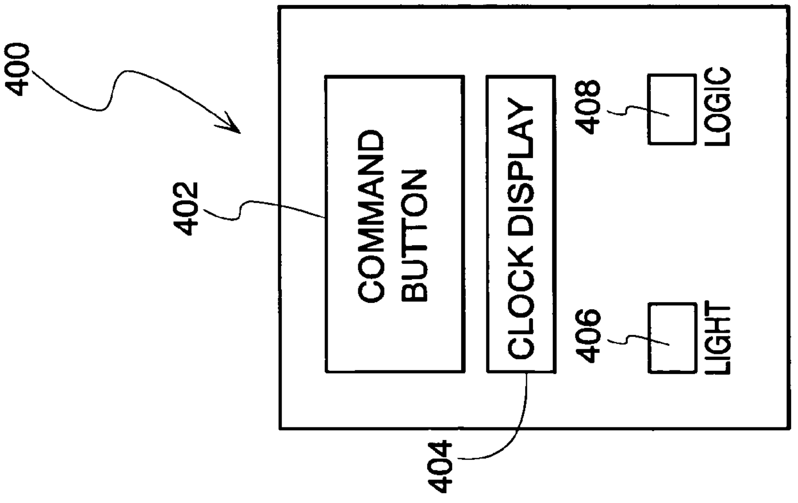

Referring now to FIGS. 4*a–c*, different examples of configurations for a wall unit are described. In these configurations, the clock is built into the garage door operator. The clock display itself is located on the wall control or the operator. In these approaches, the function keys included in the wall control are used for programming the clock to actuate the garage door opener under certain circumstances. In other embodiments, the clock may be located in the wall control.

Referring to FIG. 4*a*, the wall control 400 includes a command button 402, a clock display 404, a light button 406, and a lock button 408. The command button 402 is used to open, close, or halt the operation of the door. The clock display shows the time-of-day. The light button 406 illuminates a light in the garage and the lock button 408 is used to lock the keypad.

In this example, the user may use the command button and/or the other buttons to program the clock. For example, certain combinations of buttons may be used to program when the garage door is to be opened and closed.

Referring to FIG. 4*b*, another example of a wall control unit 420 is described. In this example, the wall control 420 includes a command button 422, a clock display 424, an increase time function button 426, a decrease time function button 428, a light button 430, and a lock button 432. The command button is used to open, close, or halt the operation of the door. The clock display shows the time-of-day. The light button 430 illuminates a light in the garage and the lock button 432 is used to lock the keypad.

In this case, the buttons 426 and 428 are used to set the time of the clock. Other buttons may be used to determine that the garage door is to be opened or closed at the times indicated by the clock.

Referring to FIG. 4*c*, another example of a wall control unit 440 is described. In this case, the wall control 440 includes a command button 442, a clock display 444, and keypad 446 (including numerical keys and an enter button) and enter key 448. The command button 442 is used to open, close, or halt the operation of the door. The clock display 444 shows the time-of-day.

The keypad 446 is included to allow a user to program the times into the clock. For example, predetermined commands as well as times may be programmed into the wall control unit 440 via the keypad 446. These commands and times allows a user to select, for example, when the garage door should be opened and when the garage door should be closed.

In the preceding embodiments, timed functions and the resettable clock/timer are performed in the barrier operator head unit 12 and/or wall control 43. Such timed functions and resettable clock/timer may also be located in a transmitter e.g. 30 to, for example, activate or deactivate a transmitter function.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method for controlling a moveable barrier operating system comprising:

receiving a generally available wireless time signal at a receiver;

supplying a time-of-day at the output of the receiver;

automatically resetting the receiver using the generally available wireless time signal when the time-of-day signal is different than a time represented by the generally available wireless time signal; and actuating a moveable barrier operator in response to the time-of-day output of the receiver.

2. The method of claim 1 wherein receiving the generally available wireless time signal includes receiving a time signal indicating time from a clock reference.

3. The method of claim 1 wherein actuating the moveable barrier operator includes actuating the moveable barrier operator to close the movable barrier operator at a predetermined time.

4. The method of claim 1 wherein actuating the moveable barrier operator includes actuating a movable barrier operator to prevent the movement of a movable barrier operator at a predetermined time.

5. The method of claim 1 wherein actuating the moveable barrier operator includes actuating the movable barrier operator to open a movable barrier operator at a predetermined time.

6. A method for controlling a moveable barrier operator comprising:

receiving user input indicating when a moveable barrier should be actuated;

adjusting a time signal representing the time-of-day in response to a received generally available wireless time signal;

comparing the user input to the time signal; and actuating a movable barrier operator based upon comparing the user input to the signal.

7. A system for controlling a movable barrier operator comprising:

a receiver receiving a generally available wireless time signal and adjusting a time signal in response to the generally available received wireless time signal; and a movable barrier operator coupled to the receiver and receiving the generally available wireless time signal output, the movable barrier operator selectively actuating a movable barrier operator based upon the time signal output.

8. The system of claim 7 further comprising:

a keypad communicatively coupled to the movable barrier operator for receiving user input, the user input including information indicating when an actuation of the movable barrier should occur.

9. The system of claim 8 wherein the information indicates closing the movable barrier operator at a predetermined time.

10. The system of claim 8 wherein the information indicates preventing the movement of a movable barrier operator at a predetermined time.

11. The system of claim 8 wherein the information indicates opening a movable barrier operator at a predetermined time.

12. The system of claim 7 wherein the time signal is received from is a clock reference.

13. A method for controlling a moveable barrier operating system comprising:

receiving a generally available wireless time signal at a receiver;

supplying the generally available wireless time signal at the output of the receiver; and actuating the moveable barrier operator using the generally available wireless time signal output of the receiver.

* * * * *